United States Patent [19]

Roberts

[11] 4,303,797

[45] Dec. 1, 1981

[54] METHOD AND APPARATUS FOR CONTROLLING ELECTRODE DRIVE SPEED IN A CONSUMABLE ELECTRODE FURNACE

[75] Inventor: Raymond J. Roberts, W. Berlin, N.J.

[73] Assignee: Consarc Corporation, Rancocas, N.J.

[21] Appl. No.: 161,461

[22] Filed: Jun. 20, 1980

[51] Int. Cl.³ .............................................. H05B 7/152
[52] U.S. Cl. ........................................ 13/13; 13/9 ES
[58] Field of Search ........................... 13/9 ES, 12, 13

[56] References Cited

U.S. PATENT DOCUMENTS

| | | |
|---|---|---|
| 2,726,278 | 12/1955 | Southern . |
| 2,904,718 | 9/1959 | Cooper et al. . |
| 2,942,045 | 6/1960 | Johnson . |
| 3,186,043 | 6/1965 | Murtland, Jr. et al. . |
| 3,187,078 | 6/1965 | Murtland, Jr. et al. . |
| 3,246,070 | 4/1966 | Wooding . |
| 3,272,905 | 9/1966 | Wooding . |
| 3,277,229 | 10/1966 | Oppenheim . |
| 3,364,295 | 1/1968 | Roberts . |
| 3,372,224 | 3/1968 | Jackson et al. . |
| 3,375,318 | 3/1968 | Kjølseth et al. . |
| 3,381,079 | 4/1968 | Murtland, Jr. et al. . |
| 3,431,344 | 3/1969 | Borrebach .......................... 13/13 |
| 4,075,414 | 2/1978 | Thomas . |
| 4,131,754 | 12/1978 | Roberts . |
| 4,194,078 | 3/1980 | Thomas . |

OTHER PUBLICATIONS

A System for the Automatic Measurement & Control of Melt Rate During Electroslag Remelting; R. J. Roberts, Oct. 16-18, 1974.

*Primary Examiner*—R. N. Envall, Jr.
*Attorney, Agent, or Firm*—Seidel, Gonda, Goldhammer & Panitch

[57] ABSTRACT

A method and apparatus for controlling electrode drive speed in a consumable electrode furnace. The electrode drive speed is regulated at a base speed computed from measured changes in physical characteristics of the electrode or ingot, such as changes in weight, as the melt proceeds. The base speed also takes into consideration the known geometry of the electrode, the furnace mold or crucible, the density of the ingot material, and the speed of movement of the bottom of the ingot if any. This base speed is increased or decreased by a trim speed determined from measurement of an electrical phenomenon associated with the consumable electrode process, which electrical phenomenon has a relatively long term value related to the distance between the bottom surface of the electrode and the top surface of the ingot.

19 Claims, 1 Drawing Figure

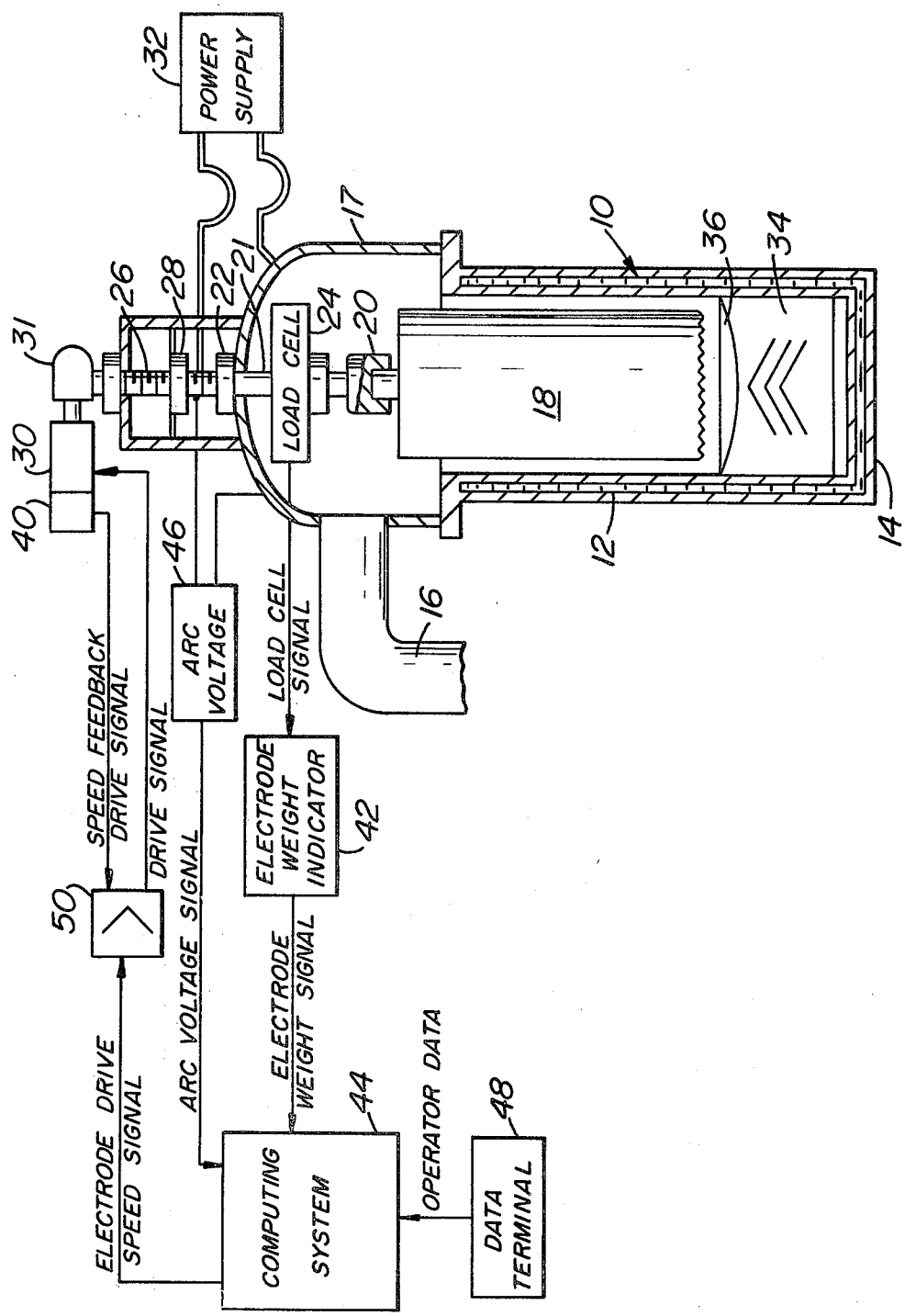

METHOD AND APPARATUS FOR CONTROLLING ELECTRODE DRIVE SPEED IN A CONSUMABLE ELECTRODE FURNACE

This invention relates to a method and apparatus for controlling the gap between the bottom of an electrode and the top surface of an ingot in a consumable electrode furnace. More particularly, this invention relates to controlling this gap by controlling electrode drive speed as a function of electrode drive base speed ($S_B$) as algerbraically modified by the trim speed ($S_T$). Base speed ($S_B$) is determined from the melt rate and the known geometry of the electrode and the crucible together with measured changes in the electrode or ingot weight as the melt proceeds. Trim speed ($S_T$) is determined by a relative by slow acting control loop using voltage discontinuities as a feedback signal. Thus, electrode drive speed may be adjusted during a melt according to the equation $$S = f(S_B, S_T)$$

for example:
$$S = S_B + S_T$$

BACKGROUND OF THE INVENTION

The proper positioning of the electrode is a critical element in the operation of a consumable electrode furnace, for example a vacuum arc furnace. The operation of a vacuum arc furnace depends upon the control of the arc length or the arc gap which is the distance between the bottom of the electrode and the surface of the pool of molten metal at the top of the ingot. The quality of an ingot formed in such a furnace depends upon the maintenance of a consistent arc length which can be neither to short nor too long.

The problem of maintaining the proper arc length has been dealt with in various ways by furnace manufacturers and users. Initially, the voltage gradient across the gap was used but this proved to be inadequate. Subsequently it was discovered that the frequency and/or duration of periodic fluctuations in the arc voltage signal could be used to improve control of arc length throughout the vacuum arc electrode melting procedure. Several patents have elaborated upon the necessity of controlling the electrode position so as to maintain a predetermined arc length throughout the melt procedure, and on the difficulties that are found in attempting to do this. See, for example, U.S. Pat. Nos. 2,942,045; 2,904,718; 3,372,224; 3,187,078 and 3,186,043. Some of these patents, such as U.S. Pat. Nos. 2,942,045 and 3,187,078, disclose the use of the frequency and/or duration of periodic fluctuations in the arc voltage signal, either alone (U.S. Pat. No. 2,942,045) or in combination with the arc voltage signal (U.S. Pat. No. 3,187,078) as an indication of arc length.

The operation of a consumable electrode furnace is a dynamic process. The electrode is being consumed and therefore must be lowered to compensate for its shortened length. The ingot is of course being formed within the crucible and therefore the rate at which its surface rises affects the speed at which the electrode is lowered toward that surface. The electrode drive means is therefore traditionally set to adjust the electrode feed rate to maintain constant arc length using the frequency and/or duration of periodic fluctuations in the arc voltage as a feedback signal indicative of arc length.

A fundamental problem with arc length regulating systems of this type is that the periodic fluctuations in arc voltage, while having a long term average relationship to arc length, also have a short term random component. Accurate determination of arc length requires that measurements be made of the average frequency and/or duration of fluctuations in the arc voltage signal over a sufficiently long period of time for the random fluctuations to average out to zero.

This creates a dilemma in the design of the arc length control system. If the control system is made responsive and relatively fast acting, it also responds to short term random components in the feedback signal, which in turn leads to ranrandom short term fluctuation of the arc length that can have severe deleterious effects upon the ingot quality. If the control system is made less responsive, it cannot generate the relatively rapid changes in electrode drive speed which are required when the melt rate is changed rapidly as often the case at the beginning and the end of a melt. In this latter case the lag in response of the electrode control system leads to excessively long arc lengths when the melt rate is increasing and to excessively short arc lengths when the melt rate is decreasing.

The existence of the above problem is acknowledged in U.S. Pat. No. 2,942,045 at column 8, line 61 through column 9, line 27, and is touched upon in U.S. Pat. No. 3,187,078 at column 3, lines 11 and 12. Both of these patents disclose control systems which take the second of the two design approaches mentioned above; i.e. the arc length control system is made slow acting by incorporating electrical or electromechanical integrators having long time constants in the control loop.

Analagous problems exist in other types of consumable electrode furnaces such as electroslag remelting (ESR) furnaces. Conventionally the electrode drive speed is based upon measurement of current flow through the slag both or the voltage across it. As in the cae of the vacuum arc furnace, such electrical measurements are subject to undesirable short term or random disturbances. For example, the voltge may drop during start up of another piece of machinery connected to the same electrical power distribution network which is supplying electrical power to the ESR furnace. It would be undesirable for the electrode drive to respond to such a disturbance.

SUMMARY OF THE INVENTION

This invention provides a control system which eliminates the aforesaid disadvantages of having to choose between either an overly responsive or less responsive control system for controlling electrode speed during a melt and therefore provide consisent maintenance of the gap between the bottom of an electrode and the upper surface of an ingot. In accordance with this invention, the control system for electrode drive speed is based upon a combination of two signals herein denominated as base speed ($S_B$) and trim speed ($S_T$) which may be stated by the following equation:

$$S = S_B + S_T \qquad \text{(Equation 1)}$$

S = electrode drive speed
$S_B$ = base speed
$S_T$ = trim speed

Equation 1 permits the control system to respond to rapid changes in melt rate with immediate variations in the base speed. However, the errors inherent in controlling electrode drive speed solely by base speed are compensated by the trim speed. More particularly, base speed is calculated from the melt rate and the known geometry of the electrode and the crucible together with the measured change in electrode or ingot weight as the melt proceeds. Trim speed is determined by a relatively slow acting control loop using electrical parameters such as volt discontinuities as a feedback signal. Although Equation 1 is written as an algerbraic sum, it is within the scope of this invention that $S_T$ modify $S_B$ by mathematical minipulation other than summation.

Thus, the present invention provides an electrode drive speed control system for a consumable electrode furnace which regulates the electrode drive speed at a base speed computed from measured changes in physical characteristics of electrode or ingot, such as changes in weight, as the melt proceeds, the known geometry of the electrode, the crucible, density of the ingot material, and the speed of movement of the bottom of the ingot (if any) with such base speed being increased or decreased by a trim speed determined from measurements of electrical phenomenon associated with the consumable electrode process, which electrical phenomenon having relatively long term value related to the distance between the bottom surface of the electrode and the top surface of the ingot. In a vacuum arc furnace the chosen electrical phenomenon may be the frequency and/or duration of periodic fluctuations in the arc voltage signal. In an electroslag furnace the chosen electrical phenomenon may be the magnitude of the voltage across the slag bath or the magnitude of the current through it.

For the purpose of illustrating the invention, there is shown in the drawing a form which is presently preferred; it being understood, however, that this invention is not limited to the precise arrangements and instrumentalities shown.

BRIEF DESCRIPTION OF THE DRAWING

FIG. 1 is a schematic block diagram of a control system for controlling electrode drive speed in a consumable electrode furnace.

DETAILED DESCRIPTION OF THE INVENTION

Referring now to the drawing in detail, wherein like numerals indicate like elements, there is shown a schematic drawing of a closed loop control system for a vacuum arc furnace 10. Although the invention is described in relation to a vacuum arc furnace, it should be understood that this is by way of example, not limitation, and the invention is also applicable to the operation of other consumable electrode furnaces including electroslag furnaces.

As shown, the vacuum arc furnace 10 includes an ingot mold defined by a water cooled crucible 12 positioned on a water cooled stool 14. A vacuum is maintained within the crucible 12 by evacuating equipment (not shown) connected to the pipe 16 in head 17.

The electrode 18 is supported within the furnace 10 by the clamp 20 at the end of ram 21. Ram 21 extends through an appropriate vacuum seal 22 in the top wall of the furnace 10. Clamp 20 includes the load cell 24. Ram 21 in turn is connected to an electrode support screw 26 which rotates within nut 28. Electrode support screw 26 is rotated by the electrode drive motor 30 and gearing 31.

Power to operate the furnace 10 is provided by the direct current power supply 32.

The vacuum arc furnace 10 per se is known to those skilled in the art as exemplified by U.S. Pat. Nos. 2,726,278 and 3,246,070. Accordingly, a more detailed description of its function and operation need not be provided.

The furnace 10 is shown in mid melt with an ingot 34 partially formed in the crucible 12. A pool of molten metal 36 on the top of ingot 34 is formed as fused droplets of metal fall from the electrode 18. It is believed that it is the molten droplets or the splash which they create within the pool of molten metal that creates the voltage discontinuities.

The electrode drive motor 30 turns the electrode drive screw 26 and hence lowers the electrode 18 toward the ingot 34. The speed at which it lowers the electrode is determined by the control system hereinafter described.

As noted above electrode drive speed S is a function of base speed $S_B$ andd trim speed $S_T$; i.e.

$$S = f(S_B, S_T)$$

It has also been indicated that electrode drive speed S in accordance with the foregoing function may be determined by the following equation:

$$S = S_B + S_T \quad (1)$$

Where:
S = electrode drive speed
$S_B$ = base speed
$S_T$ = trim speed

Base speed $S_B$ is determined by a control system which solves the following two equations.

$$B = \frac{We \times 4}{\pi \times De^2 \times Le} \quad \text{(Equation 2)}$$

Where:
$\pi \approx 3.1416$
B = average electrode density
We = initial electrode weight
De = electrode diameter
Le = initial electrode length $$S_B = \frac{4M}{\pi} \left( \frac{1}{De^2 \times B} - \frac{1}{D^2i \times A} \right) \quad \text{(Equation 3)}$$

where:
$\pi \approx 3.1416$
$S_B$ = electrode base speed
M = melt rate calculated from the rate at which the electrode rate decreases or the ingot weight increases
De = electrode diameter
B = average electrode density
Di = ingot diameter
A = average ingot density The derivation of equation 3 is as follows (using English units).

It is known that for a cylindrical ingot of diameter $D_I$ (inches), and density A (lbs per cubic inch), the axial length for 1 lb weight is given by:

$$L_I \text{ (inches)} = \frac{4}{\pi \times D_I^2 \times A}$$

Similarly for an electrode of diameter $D_e$ (inches) and density B (lbs per cubic inch) the length for 1 lb weight is:

$$L_e \text{ (inches)} = \frac{4}{\pi \times D_e^2 \times B}$$

If the base of the ingot is stationary and the arc length is to be kept constant, the electrode must be lowered an amount equal to the difference between the electrode length and the ingot length.

Therefore for each pound melted the electrode must be lowered a distance $T_1$ inches given by:

$$T_1 = L_e - L_I = \frac{4}{\pi}\left(\frac{1}{D_e^2 B} - \frac{1}{D_I^2 A}\right)$$

Therefore for M pounds melted the travel ($T_M$) is $$T_M = \frac{4M}{\pi}\left(\frac{1}{D_e^2 B} - \frac{1}{D_I^2 A}\right) \text{ inches.}$$

If M pounds are melted in 1 hour (i.e. a melt rate of M pounds per hour) then the electrode is lowered at $T_M$ inches per hour, to maintain constant arc length.

The foregoing equations are based upon the assumption that the electrode and crucible are approximately cylindrical. Crucibles are usually slightly tapered and electrodes are often tapered as well. Moreover, both the electrode and crucible may have non-circular cross sections. However, such variations may readily be accomodated by modification of the above calculations.

The electrode diameter and length are readily measured prior to the start of a melt. The electrode weight is measured at the start and at regular intervals during the melt. These initial measurements readily provide electrode density.

Ingot density is known from prior experience as is the average diameter of the ingot which is formed in a crucible of known diameter.

The determination of average electrode density (B) is made once at the start of the melt to establish the average value of B to be used throughout the entire melt.

Calculation of melt rate M and base speed $S_B$ are made at frequent intervals throughout the melt to determine a new value of speed at which the electrode is to be driven. Accordingly, base speed ($S_B$) will vary in accordance with required changes in the melt rate (M). The melt rate is the weight per unit of time at which the electrode is fused into molten metal. As described in U.S. Pat. No. 4,131,754, a melt rate signal can be calculated and used as a feedback signal in an automatic melt rate control system for the power supply. The melt rate control system of U.S. Pat. No. 4,131,754 is referred to and incorporated herein by such reference.

By way of example, not limitation, melt rate M can be calculated as described in "A System for the Automatic Measurement and Control of Melt Rate During Electroslag Remelting" by Raymond J. Roberts, published in the proceedings of the Fifth International Symposium on Electroslag and Other Special Melting Technologies on Oct. 16–18, 1974 in Pittsburgh, Pa.

Trim speed ($S_T$) can be determined in a number of ways, depending upon whether the control system is to be based upon the frequency, duration or both frequency and duration of the fluctuations in the arc voltage signal. In the following explanation, it is assumed that control of trim speed is to be based upon the frequency of occurence of voltage variations caused by droplets of metal which bridge the arc gap. This drip short phenomenon is described in U.S. Pat. No. 2,942,045.

The control system uses this phenomenon to compute trim speed $S_T$ by measuring the time interval between successive drip shorts, and calculating the average time between a predetermined number of the most recent drip shorts. By way of example, it may calculate the time interval between the ten (10) most recent shorts. However, that the number may adjusted upward or downward depending upon experience and may vary depending upon crucible size and metal alloy.

This average time is then compared with a set point average to determine trim speed as follows:

$$S_T = K_1 e + K_2 \int e \, dt + K_3 de/dt \qquad \text{(Equation 4)}$$

where:
$e = T_a - T_{sp}$ error between average time between drip and set point time between drip shorts
$T_a$ = the average time between the predetermined number of the most recent drip shorts
$T_{sp}$ = set point average time between drip shorts
$S_T$ = electrode drive trim speed
$K_1$ = proportional constant
$K_2$ = integral constant
$K_3$ = rate constant $K_1$, $K_2$ and $K_3$, are the constants for the standard three term control equation widely used in closed loop control processes. As used in accordance with the control system of the present invention, $K_1$ and $K_3$ should be made small relative to $K_2$ so that the integral term becomes dominant in Equation 4. Further, $K_2$ should itself be made sufficiently small that a relatively long time is required for $S_T$ to make appreciable changes in total speed.

$T_{sp}$ may be a constant for a particular arc length and material, or may itself be a variable which has a known relationship to current level and/or vacuum level at a particular arc length.

The value of base speed ($S_B$) and trim speed ($S_T$) is recomputed frequently during a melt, and the electrode drive speed adjusted according to Equation 1. Since the melt rate (M) in Equation 3 is always zero or positive, and since the electrode diameter is always smaller than the ingot diameter and the density of the electrode is always equal to, or smaller than the ingot density, the value ($S_B$) computed in Equation 3 will be zero or some positive value.

The trim speed ($S_T$) computed in Equation 4 may be positive or negative, and will act to increase or decrease the drive speed relative to the base speed. Thus, the trim speed ($S_T$) compensates for any inaccuracies in the value used to compute the base speed ($S_B$); that is, the value on the right hand side of Equation 1.

Equation 4 relates to a determination of $S_T$ in a control system. However, examination of the equation shows that the controlling variable for a vacuum arc furnace is $T_a$. Thus, a more general function for the electrode drive speed in a vacuum arc furnace can be derived. Thus, $S = f(S_B, S_T)$
$S_T = f(T_a - T_{sp})$
$T_{sp}$ is a constant
$S = f(S_B, T_a)$ Where:
S = electrode drive speed
$S_B$ = base speed
$T_a$ = a quantity based upon statistical analysis of the frequency and/or duration of drip shorts The advantage of controlling the gap between the lower end of an electrode and the top surface of a ingot using electrode drive speed based upon a combination of base speed and trim speed can now be better appreciated. Rapid changes in the melt rate will result in immediate variation in base speed ($S_B$). This enables the electrode drive to track such variations accurately. However, if this system alone were used to control the electrode drive, inevitably minor inaccuracies of measurement or in assumptions made in respect to the various parameters on the right side of the equality side of Equation 3 may result in a slow cumulative buildup error in the value of the arc length. However, such a slow buildup is compensated by the trim speed ($S_T$) function which is calculated based upon the observation of the arc voltage signals taken over a sufficiently long time that random fluctuations can be eliminated by averaging or other statistical minipulation.

It is not intended that the modification of base speed by a trim speed function be limited to the algebraic addition described above. For example the error value calculated as per Equation 4 could be used to conpute a multiplying factor by which the base speed is adjusted. In this system an error value of zero would result in a multiplying factor of unity i.e. the electrode would be driven at base speed. A positive error value (resulting from an arc length which is too long) would result in a multiplying factor greater than unity i.e. the electrode drive speed would be higher than base speed, so as to decrease the arc length towards the desired value. Conversely a negative error would result in a multiplying factor of less than unity so as to decrease the drive speed and thereby increase the arc length toward the desired value.

The foregoing determination of electrode drive speed assumes that the bottom of the ingot 34 is stationary. Nonstationary ingots, such as are used in an ingot withdrawl vacuum arc remelting system, can be accomodated by an extension of the control equations. If the base of the ingot is withdrawn at a speed ($S_T$), then this amount must be added to the electrode drive speed:

$S = S_B + S_T + S_I$ (Equation 5)

A control system which provides electrode drive speed in accordance with Equation 1 is shown in FIG. 1.

The speed at which the electrode 18 is lowered within the crucible 12 is directly proportional to the rate at which screw 26 is rotated by electrode drive motor 30. Accordingly, electrode drive motor 30 is provided with a tachometer 40 whose output signal is proportional to the speed of motor 30. Motor 30 is a variable speed electric motor such as the motor 34 shown in U.S. Pat. No. 2,726,278.

Load cell 24 provides a signal which is proportional to electrode weight. This signal is fed to electrode weight indicator 42. Load cell 24 may be any one of several types of devices used to measure the weight of an electrode as it is being melted. It can be either an hydraulic or strain gauge type as desired. By way of example, the load cell 24 may be of the type described in U.S. Pat. No. 3,272,905. Load cell 24 may be positioned outside the furnace.

Electrode weight indicator 42 provides exitation for the load cell 24, if required, and converts the output signal of load cell 24 into a weight signal. Suitable electrode weight indicators are available from several sources, including BLH Electronics of Waltham, Mass.

Electrode weight indicator 42 feeds an electric signal proportional to electrode weight to the computing system 44. Computing system 44 may be either an analog or digital computer. Preferably it is either a minicomputer, microcomputer or programmable calculator provided with appropriate interface circuitry for receiving and sending analog and/or digital signals from and to the various circuits described herein. Suitable computing systems are available from Data General, Inc., Digital Equipment Corporation and others.

An arc voltage signal is detected by arc voltage circuit 46 and provided as an input to the computing system 44. The computing system receives the arc voltage signal and determines the error e between the average time between a predetermined number of the most recent drip shorts $T_a$ and the set point average time between drip shorts $T_{sp}$.

For an electroslag furnace, the computing system compares variations in the magnitude of the voltage across the slag bath or variations in the magnitude of the current through the slag bath to a set point voltage or current to provide the error signal for calculating $S_T$ in Equation 4. In addition, computing system 44 receives operator supplied input data from data terminal 48. This may be provided by any one of a keyboard/printer, CRT terminal or card or paper tape reader as is well known in the computer art. Suitable terminals, keyboards or the like are available from Texas Instruments, Lear Seagler, Hazeltine or others. If an analog computing system is used, then the data may be inputted using potentiometers.

Amplifier 50 provides a drive signal to motor 30 in response to the electrode drive speed signal S provided by the computing system 44. Amplifier 50 may be a magnetic amplifier, thyristor or transistor type of motor speed controller. Suitable motor speed controllers may be acquired from Westinghouse Electric Corporation, General Electric Corporation and others. Such motor speed controllers detect the actual speed of motor 30 based upon the signal received from tachometer 40 and adjust that speed to the desired electrode drive speed S.

From the foregoing, it should be apparent that the computing system 44 is provided with all of the information necessary to solve Equation 1. Electrode weight is continuously provided by electrode weight indicator 42 and the arc voltage signal is continuously provided by arc voltage circuit 46. All other data as well as updates on such data are provided by the operator terminal 48. It should be noted that the system works equally well by continuously measuring ingot weight rather than electrode weight.

The present invention may be embodied in other specific forms without departing from the spirit or essential attributes thereof and, accordingle, reference should be made to the appended claims, rather than to the foregoing specification, as indicating the scope of the invention.

I claim:

1. In a consumable electrode melting furnace comprising an electrode, a fluid cooled mold, an electrical supply system for melting said electrode to form an ingot in said mold, electrode drive means for repositioning said electrode as the melt proceeds, electrode weight sensing means for measuring the weight of said electrode or said ingot, the improvement comprising a control system for regulating the output speed of said electrode drive means at a speed computed from measured changes in the weight of said electrode or said ingot during the melt, the geometry of the electrode, the geometry of the mold, and the speed of movement of the bottom of the ingot of the electrode if other than zero; said speed being increased or decreased by a trim speed function determined from measurement of voltage or current or other electrical phenomenon which has a value related to the distance between the bottom surface of the electrode and the top surface of the ingot.

2. The consumable electrode melting furnace of claim 1 in which the electrical phenomenon has a value determined over a period of time that is relatively longer than the period of time over which changes in speed are computed based upon measured changes in the weight of the electrode or ingot during the melt.

3. The consumable electrode melting furnace of claim 1 wherein the output speed of said electrode drive means is further computed based upon the density of the ingot material.

4. In a consumable electrode melting furnace in accordance with claim 1 wherein the furnace is a vacuum arc furnace.

5. The consumable electrode melting furnace in accordance with claim 4 wherein the electrical phenomenon used for computation of the trim speed function is the frequency and/or duration of voltage excursions in the voltage across the arc.

6. The consumable electrode furnace in accordance with claim 1 wherein the furnace is an electroslag furnace.

7. The consumable electrode furnace in accordance with claim 6 in which the electrical phenomenon used to compute trim speed is the magnitude of the voltage across the slag bath, or the magnitude of the current through the slag bath.

8. In a consumable electrode furnace in accordance with claim 6 wherein the electrical phenomenon used to compute the trim speed is the magnitude of the variation of current through the slag bath, which variation is the result of surface contact phenomena at the interface between the bottom of the electrode and the slag.

9. A control system for maintaining a consistent gap between the bottom of an electrode and the upper surface of an ingot in a consumable electrode melting furnace of the type wherein an electrode is melted within a fluid cooled mold by passing electricity through said electrode to form an ingot in said mold, said furnace including electrode drive means for repositioning said electrode as the melt proceeds and weight sensing means for measuring the weight of said electrode or said ingot as the melt proceeds, said control system comprising means to regulate the output speed of said electrode drive means at a speed computed from measured changes in the weight of said electrode or said ingot during the melt, the geometry of the electrode, the geometry of the mold, and the speed of movement of the bottom of the ingot if other than zero; said speed being increased or decreased by a trim speed function determined from measurement of voltage or current or other electrical phenomenon havng a value related to the distance between the bottom surface of the electrode and the top surface of the ingot.

10. A control system in accordance with claim 9 in which the electrical phenomenon has a value determined over a period of time that is relatively longer than the period of time over which changes in speed are computed based upon measured changes in the weight of the electrode or ingot during the melt.

11. A control system in accordance with claim 9 wherein the output speed of said electrode drive means is further computed based upon the density of the ingot material.

12. A control system in accordance with claim 9 wherein the furnace is a vacuum arc furnace.

13. A control system in accordance with claim 12 in which the electrical phenomenon used for computation of the trim speed function is the frequency and/or duration of voltage excursions in the voltage across the arc.

14. A control system in accordance with claim 9 wherein the furnace is an electroslag furnace.

15. A control system in accordance with claim 14 in which the electrical phenomenon used to compute trim speed is the magnitude of the voltage across the slag bath, or the magnitude of the current through the slag bath.

16. A control system in accordance with claim 14 wherein the electrical phenomenon used to compute the trim speed is the magnitude of the variation of the voltage across the slag bath or the variation of current through the slag bath, which variations are the result of surface contact phenomena at the interface between the bottom of the electrode and the slag.

17. A process for consistently maintaining the spacing between the bottom of an electrode and the top of an ingot in a consumable electrode melting furnace of the type having an electrode, a fluid cold mold, an electrical supply system for melting said electrode to form an ingot in said mold, electrode drive means for repositioning said electrode during the melt and means for measuring the weight of said electrode or said ingot during the melt, the process comprising controlling the output speed of the electrode drive means at a speed computed from the measured changes in the weight of said electrode or said ingot during the melt, the geometry of the electrode, the geometry of the mold, and the speed of movement of the bottom of the ingot if other than zero, and increasing or decreasing said speed by a trim speed function determined by the measurement of voltage or current or other electrical phenomenon having a value related to the distance between the bottom of the surface of the electrode and the top surface of the ingot.

18. A process in accordance with claim 17 including controlling the output speed of said electrode drive means at a speed further based upon the density of the ingot material being formed.

19. Apparatus for controlling electrode drive speed in a vacuum arc furnace wherein a consistent gap between the bottom an electrode of circular cross section and the upper surface of an ingot of circular cross section is to be maintained, said furnace comprising an electrical supply system for melting the electrode, a fluid cooled mold, electrode drive means for adjustably repositioning the electrode within the mold during the melt, means for sensing the weight of the electrode during the melt, and means for controlling the speed at which said drive means adjusts the position of the electrode to maintain said gap, said speed being determined by the relationship:

$$S = f(S_B, T_A)$$

Where:
$S_B$ = base speed
$T_A$ = A quantity based on statistical analysis of the frequency and/or duration of drip shorts and $$S_B = \frac{4M}{\pi} \left( \frac{1}{De^2 \times B} - \frac{1}{D^2i \times A} \right)$$

Where:
$\pi \cong 3.1416$
$S_B$ = electrode base speed
M = melt rate calculated from the rate at which the electrode weight decreases or the ingot weight increases
De = electrode diameter
B = average electrode density
Di = ingot diameter
A = average ingot density $$B = \frac{We \times 4}{\pi \times De^2 \times Le}$$

and
Where:
$\pi \cong 3.1416$
B = average electrode density
We = initial electrode weight
De = electrode diameter
Le = initial electrode length.

* * * * *

UNITED STATES PATENT AND TRADEMARK OFFICE
CERTIFICATE OF CORRECTION

PATENT NO. : 4,303,797
DATED : December 1, 1981
INVENTOR(S) : Raymond J. Roberts It is certified that error appears in the above—identified patent and that said Letters Patent is hereby corrected as shown below:

Col. 9, line 16, delete "of the electrode".

Signed and Sealed this

Eighth Day of June 1982

[SEAL]

Attest:

GERALD J. MOSSINGHOFF

Attesting Officer     Commissioner of Patents and Trademarks